(12) United States Patent
Gopalakrishnan

(10) Patent No.: US 6,871,313 B2
(45) Date of Patent: Mar. 22, 2005

(54) METHOD FOR ENCODING A USER IDENTIFIER IN A COMMUNICATION SYSTEM

(75) Inventor: Nandu Gopalakrishnan, Murray Hill, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 493 days.

(21) Appl. No.: 10/116,869

(22) Filed: Apr. 5, 2002

(65) Prior Publication Data

US 2003/0192004 A1 Oct. 9, 2003

(51) Int. Cl.[7] .............................................. H03M 13/00
(52) U.S. Cl. .................... 714/774; 714/776; 714/781; 714/758
(58) Field of Search .............................. 714/774, 776, 714/781, 758

(56) References Cited

U.S. PATENT DOCUMENTS

| | | | | |
|---|---|---|---|---|
| 5,109,393 A | * | 4/1992 | Saegusa ........................ 375/357 |
| 5,355,412 A | * | 10/1994 | Kangas ........................ 713/161 |
| 5,430,738 A | * | 7/1995 | Tsuda ........................ 714/748 |
| 6,201,811 B1 | * | 3/2001 | Larsson et al. ........... 370/310.1 |

OTHER PUBLICATIONS

TR 26.858 V5.0: "High Speed Downlink Packet Access: Physical Layer Aspects (Release 5)" 3rd Generation Partnership Project (3GPP), Mar. 2002, pp. 1–31, XP002265002 Sophia Antipolis, FR * section 8.1: p. 13 to p. 19*.

* cited by examiner

Primary Examiner—Joseph D. Torres

(57) ABSTRACT

A method of generating coded user ID information that is combined with CRC codes and the result is appended to signaling information. The CRC codes are generated from the signaling information. The resulting codeword is transmitted over shared signaling channels to various users of a communication system. The resulting codeword is such that the likelihood of users attempting to decode codewords not intended for them is significantly reduced.

8 Claims, 3 Drawing Sheets

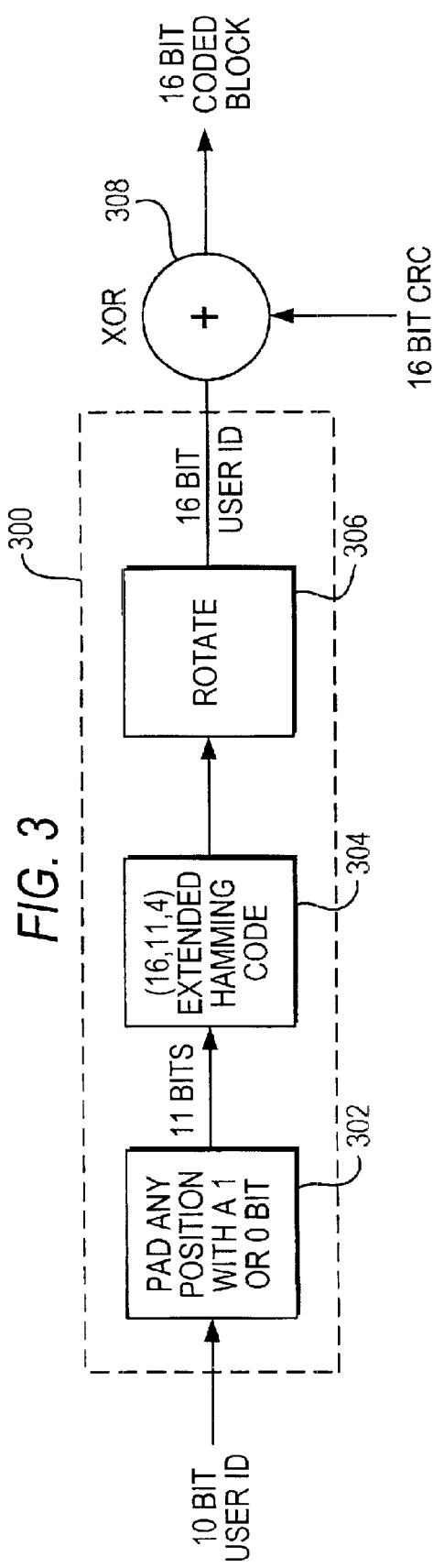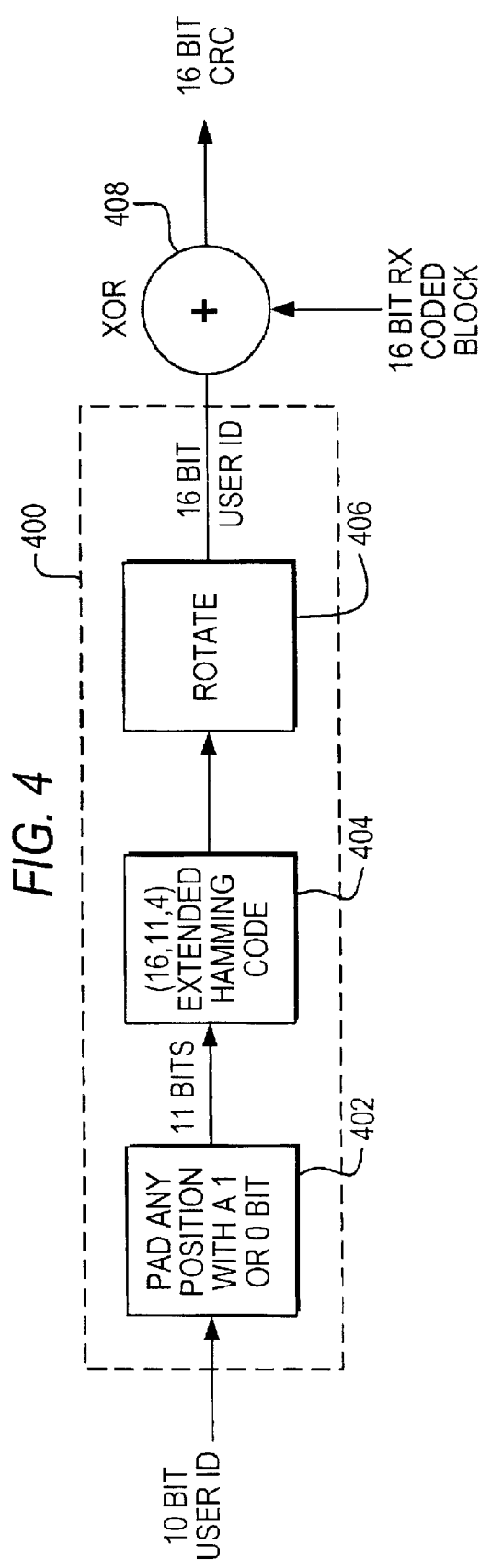

METHOD FOR ENCODING A USER IDENTIFIER IN A COMMUNICATION SYSTEM

BACKGROUND OF THE INVENTION

1. Field of the Invention

The present invention generally relates to communication systems and in particular to wireless communication systems.

2. Description of the Related Art

Communication systems have various communication channels some of which are used to convey (i.e., transmit and/or receive) information between users of the system and some of which are used to convey signaling information between various equipment of the communication system. The signaling information is also conveyed between system equipment and user equipment of the communication system. System equipment are equipment that are owned, operated and controlled by a system provider. Examples of system providers include local telephone companies, long distance companies, and Internet Service Providers. The system provider operates the communication system to provide communication services to the users. The signaling information is used by the system to manage the communication channels of the communication system. In particular, the manner in which communication is initiated, managed and terminated between users of the communication system is done with the use of signaling information.

In wireless communication systems such as systems that comply with the Universal Mobile Telecommunication System (UMTS) standard, system equipment such as base stations transmit signaling information to a user equipment (also called a mobile) to properly manage the user equipment and the communication channels being used by the user equipment. The signaling information that is transmitted from a base station to a mobile is called control information. The control information in UMTS HSDPA (High Speed Downlink Packet Access) standards (currently being developed) is transmitted over a shared channel because all the mobiles of the communication system receive their control information over this channel. The shared channel is called a High Speed Shared Control Channel (HS-SCCH). A user ID is appended to the control information to allow the control information to be processed by the intended mobile. An error detection code such as a Cyclic Redundancy Check (CRC) code is also appended to the control information. The CRC code allows a user for whom the control information is intended to determine whether the received control information contains errors. A user equipment receives the control information, decodes the received control information and if it is the intended user it begins to decode the data traffic channel HSDSCH (High Speed Downlink Shared Channel) scheduled for this user. Even if the traffic channel decode is unsuccessful, the partially decoded traffic information is stored in a buffer for combining with future re-transmissions in accordance with a Hybrid ARQ (Automatic reQuest) protocol. It is the information in the traffic Hybrid ARQ buffer that the user equipment uses to allow the system to efficiently manage the communication channels assigned to the user equipment. Therefore, it is critical that the user's traffic Hybrid ARQ buffer contain correct information and is not corrupted by erroneous information that would propagate along with future re-transmissions.

A user equipment (e.g., cellular phone, wireless personal computer, pager) thus needs to know if the received control information contains errors and furthermore needs to know if the control information is intended for the user equipment. When a user equipment attempts to decode traffic information intended for another user, the resulting decode information is corrupt leading to a false alarm. A false alarm is the decoding of received traffic information by a user where such information is not intended for the user. Thus, a false alarm situation also corrupts the user equipment's Hybrid ARQ buffer. Whether a given user is the intended recipient or not of the traffic is determined by the User Equipment with the aid of decoding a control channel (HS-SCCH) that has User ID information embedded in it. Of course, the User ID assigned by the system is a priori communicated to the User Equipment via upper layer messages at the time of call setup. Control channels have the User ID so embedded in them that only the intended user will normally be able to successfully decode the control channel; in other words a CRC check on the control information passes. If the CRC check fails then the user equipment decides that (a) the control information and the accompanying data traffic information was not intended for it or (b) even if the information were intended for the user equipment, the control information was adversely affected by channel errors and was invalid. In either case, the User Equipment discards the control information and does not attempt to decode the corresponding data traffic channel to avoid Hybrid ARQ buffer corruption. However, it may happen due to channel induced bit errors that the decode of the control channel information passes a CRC check for some user despite the transmitted (embedded) User ID not being the same as this user's ID. A false alarm event thus occurs when a user decodes a control channel in a manner where the CRC fails to detect the presence of errors in the decoded block and the user accepts the wrong information as valid information.

The control information contains I bits of information, the CRC information contains N bits of information and the user ID contains K bits of information. Correct user ID information will prevent false alarms. However, even if the user ID is correct, the user's control buffer can still be corrupted if the received control information contains errors. Consequently, it is prudent for the user equipment to determine whether both the user ID and the control information contain errors. There are two techniques that are used to detect errors in the control information and the user ID. These techniques tend to reduce the likelihood of the occurrence of false alarms.

A first technique is for the I-bit control information block to be appended to the K user ID bits and the resulting I+K bits are used to generate a CRC code of N bits which are appended to the I+K bits. The total I+K+N bits are then transmitted over the shared channel. A second technique is to first generate N bits of CRC code from the I-bit control information block and the K bits of user ID are converted to N bits (assuming K<N). The conversion of the K bits to N bits is done by zero padding, i.e., adding 0 bits to the K bits so that the total number of user ID bits is equal to N. The now N user ID bits are then modulo 2 added to the N CRC bits resulting in N user specific coded CRC bits. The N user specific coded CRC bits are appended to the I-bit control information block and the I+N bits are transmitted over the HS-SCCH. The second technique is more desirable since a fewer number of bits are transmitted over the HS-SCCH meaning less overhead in the transmission of signaling information. When K=N, there is no need to convert the K user ID bits, the K user ID bits are modulo 2 added to the N CRC bits resulting in N coded bits which are appended to the I control information bits which are then transmitted over the HS-SCCH. The probability of false alarms is thus set and is based on the value of N. To change or reduce the probability of false alarm N has to be changed. Because N is usually a set value, the probability of false alarms is usually set. When K<N, the probability of false alarms depends on how the conversion is done. What is therefore needed is a technique for converting the K user ID bits to N coded user ID bits where N is the number of bits in the CRC code generated from I control information bits and where K<N.

SUMMARY OF THE INVENTION

The present invention provides a method of generating coded information that is appended to control information to be transmitted over a shared signaling channel to users of a communication system so as to reduce the probability of false alarms between users receiving the transmitted information. A set of user IDs, each of which is K bits long, is provided. A set of control information each of which is I bits long is also provided and particular I-bit blocks of control information are associated with particular K-bit blocks of user information. N-bit blocks of error detection bits are generated from I-bit blocks of control information where K<N. An appropriate (N, K, $D_{MIN}$) coding scheme is applied to the K-bit user ID blocks to yield N-bit coded user ID blocks of information. The N-bit coded user ID blocks of information have a minimum coding distance of $D_{MIN}$ between them. The appropriate (N, K, $D_{MIN}$) coding scheme is thus the coding scheme that yields as large as possible a minimum coding distance between the N-bit coded user ID blocks of information. Each N-bit coded user ID block is then modulo 2 added to its associated N-bit error detection block resulting in N-bit coded blocks which are appended to their associated I-bit blocks of control information to yield I+N-bit codewords. Some or all pairs of the resulting I+N-bit codewords can have a coding distance of less than $D_{MIN}$. A modification to the (N, K, $D_{MIN}$) coding scheme is done so as to reduce, as much as possible, the occurrence of pairs of codewords having distances of less than $D_{MIN}$. The I+N bit codewords are then transmitted over the shared channel for decoding by intended users. Because the (N, K, $D_{MIN}$) coding scheme and its modification tend to increase the minimum and average coding distance between the resulting codewords, the likelihood that an unintended user will attempt to decode the transmitted information is significantly reduced thus significantly reducing the likelihood of false alarms.

BRIEF DESCRIPTION OF THE DRAWINGS

FIG. 3 depicts encoder structure for a (16, 10, 4) coding process that can be used for a wireless communication system that complies with the UMTS HSDPA standard.

FIG. 4 depicts decoder structure for a (16, 10, 4) coding process that can be used for a wireless communication system that complies with the UMTS HSDPA standard.

DETAILED DESCRIPTION

The present invention provides a method of generating coded information that is appended to control information to be transmitted over a shared signaling channel to users of a communication system so as to reduce the probability of false alarms between users receiving the transmitted information. A set of user IDs, each of which is K bits long, is provided. A set of control information each of which is I bits long is also provided and particular I-bit blocks of control information are associated with particular K-bit blocks of user information. N-bit blocks of error detection bits are generated from I-bit blocks of control information where K<N. An appropriate (N, K, $D_{MIN}$) coding scheme is applied to the K-bit user ID blocks to yield N-bit coded user ID blocks of information. The N-bit coded user ID blocks of information have a minimum coding distance of $D_{MIN}$ between them. The appropriate (N, K, $D_{MIN}$) coding scheme is thus the coding scheme that yields as large as possible a minimum coding distance between the N-bit coded user ID blocks of information.

Each N-bit coded user ID block is then modulo 2 added to its associated N-bit error detection block resulting in N-bit coded blocks which are appended to their associated I-bit blocks of control information to yield I+N-bit codewords. Some or all pairs of the resulting I+N-bit codewords can have a coding distance of less than $D_{MIN}$. A modification to the (N, K, $D_{MIN}$) coding scheme is done so as to reduce, as much as possible, the occurrence of pairs of codewords having distances of less than $D_{MIN}$. The I+N bit codewords are then transmitted over the shared channel for decoding by intended users. Because the (N, K, $D_{MIN}$) coding scheme and its modification tend to increase the minimum and average coding distance between the resulting codewords, the likelihood that an unintended user will attempt to decode the transmitted information is significantly reduced thus significantly reducing the likelihood of false alarms.

Figure 1:
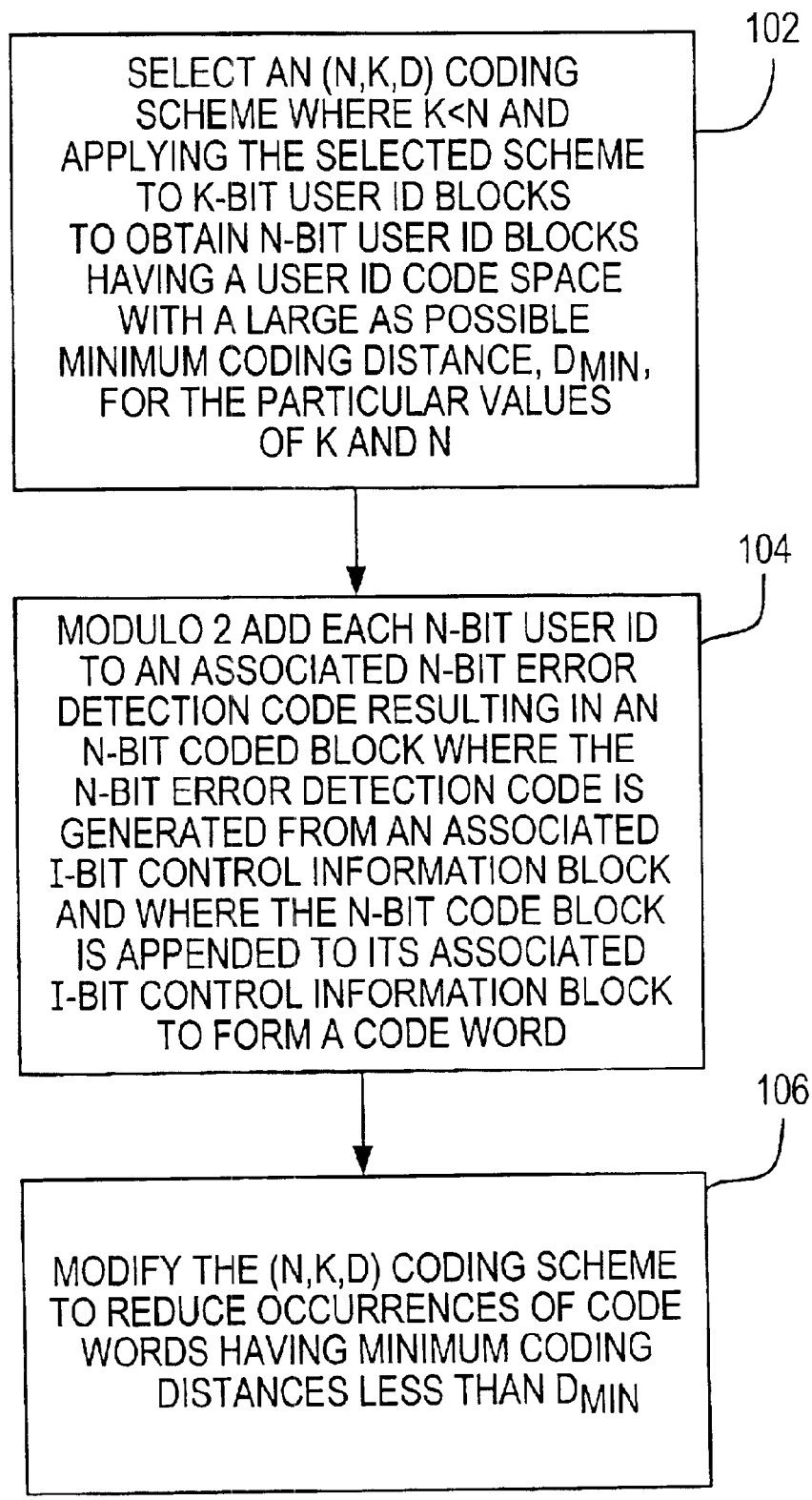
FIG. 1 depicts a flowchart of the method of the present invention.

Referring to FIG. 1, there is shown a flow chart of the method of the present invention. The method of the present invention will be discussed in the context of a wireless communication system that complies with the UMTS HSDPA standard (currently being developed) where the system transmits control information over a shared signaling channel (i.e., HS-SCCH) to various users of the system. It is clear, however, that the method of the present invention is applicable to other communication systems (wireless and wireline) that transmit signaling information over a signaling channel to various users. In the current UMTS HSDPA standard, the number of bits in a user ID is 10, i.e., K=10. The number of bits in the block of control information is 21, i.e., I=21 and the number of bits in the error detection block generated from an I-bit block of control information is 16, i.e., N=16. The error detection coding used is a UMTS standard 16 bit CRC. The values for N, K and I for the current UMTS HSDPA standard will be used in the discussion to follow. It should be well understood, however, that the method of the present invention is not limited to any particular values of N, K and I. Generally, N, K and I are integers equal to 1 or greater.

Figure 2:
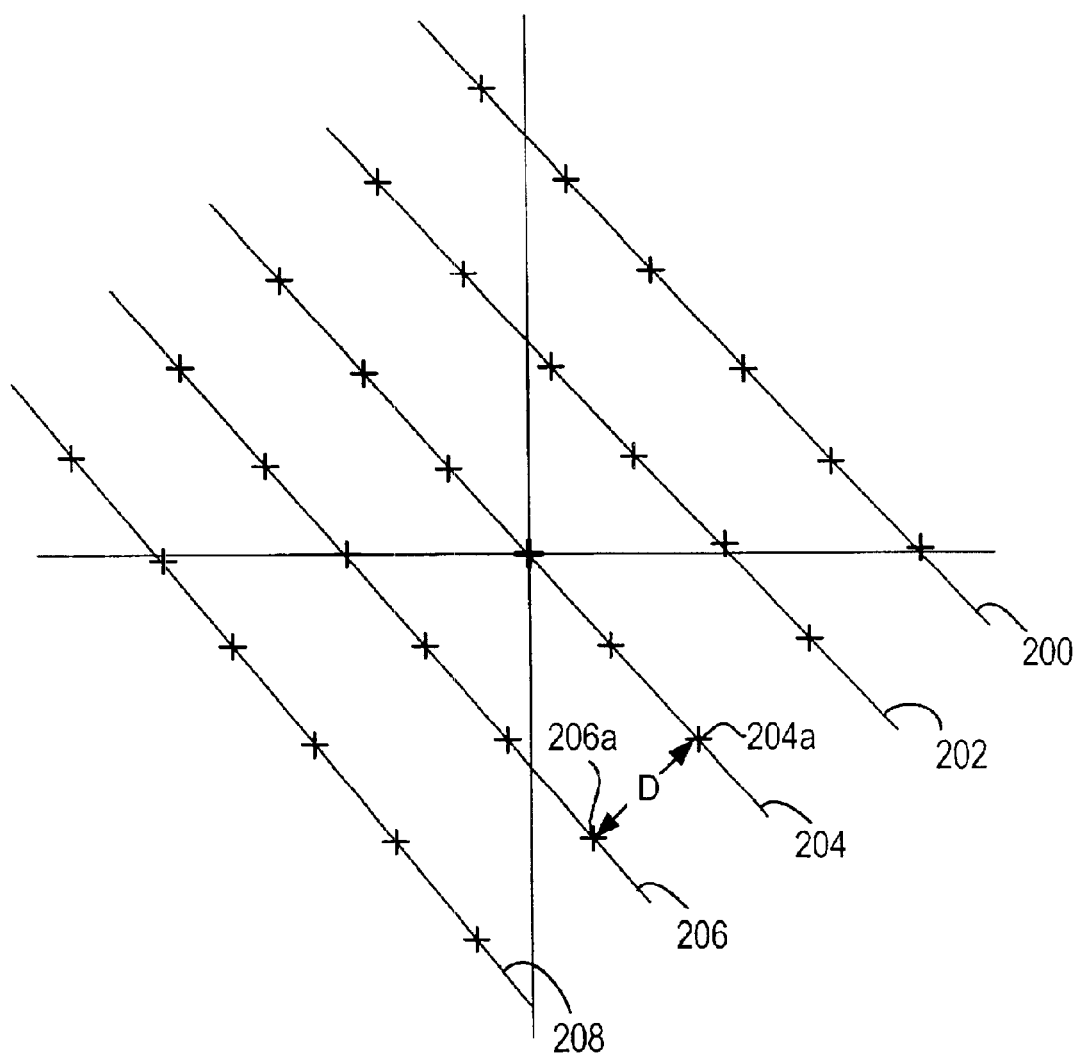
FIG. 2 depicts the code space for the codewords generated by the method of the present invention.

In step 102 an (N, K, $D_{MIN}$) coding scheme is selected such that for the particular values of K and N, the minimum coding distance ($D_{MIN}$) between the resulting N-bit coded user ID blocks is as large as possible. The concept of coding distance is shown graphically in FIG. 2 where the set of all possible 21-bit blocks of control information or code space is mapped along a line where each line represents a particular user ID value applied to the code space of the control information. Referring momentarily to FIG. 2, each of the code spaces 200–208 contains all of the possible values or codes of the control information. Since the control information contains 21 bits, the total number of possible codes is $2^{21}$. The 10-bit blocks of user IDs have a similar code space, but the total number of possible codes for the user IDs is $2^{10}$.

Thus the overall code space of code words across all users (of FIG. 2) has $2^{21} \times 2^{10} = 2^{31}$ distinct codewords.

When an (N, K, $D_{MIN}$) coding scheme is applied to the 10-bit user ID blocks to convert them to 16-bit coded user ID blocks the resulting code space is again similar to that shown in FIG. 2. The difference between the locations of corresponding codes x and y in a code space is called the coding distance $D_{xy}$; x and y represent arbitrary codes or codewords. In FIG. 2, the difference between corresponding codes 206a and 204a of code spaces 204 and 206 respectively is $D_{206a\ 204a}$. The coding distance is not necessarily the same for all corresponding codes of adjacent code spaces. There exists a minimum coding distance, $D_{MIN}$, between the coded user ID codewords that are used to distinguish adjacent code spaces. However, owing to the quirks of binary arithmetic, this does not imply that the coding distance between corresponding codewords of adjacent code spaces shown in FIG. 2 is also at least $D_{MIN}$, i.e. in general it is not always true that $D_{xy} >= D_{MIN}$. For K=10 and N=16, an (N, K, $D_{MIN}$) coding scheme called an extended Hamming code is selected after a one bit padding operation which yields a $D_{MIN}=4$. The coding scheme selected is such that it provides as large as possible minimum coding distance for the particular values of K and N. There are other coding schemes which could have been selected for K=10 and N=16, but the modified extended Hamming coding provides the largest known minimum coding distance of 4 for K=10 and N=16, *Introduction to Coding and Information Theory*, Steven Roman, Springer, 1997.

An alternative coding strategy is to consider the shortened Hamming code (15,10) which is the (15,11) Hamming code but with only even weight code words considered. This is known to have Dmin=4. Extending to (16,10) can be made easily by an additional padding (with no further improvement in its minimum coding distance).

Referring back to FIG. 1, in step 104 16-bit CRC codes are generated from the 21-bit blocks of control information in a well known fashion. It should be noted that the method of the present invention is not limited to using CRC codes as error detection codes. Other error detection coding schemes can be used with the method of the present invention. The CRC codes are combined with the coded user ID blocks to yield coded blocks. In particular, the 16-bit CRC codes are modulo 2 added (exclusive-OR operation) to associated 16-bit coded user ID blocks resulting in 16-bit coded blocks having a code space similar to that shown in FIG. 2 but whose coding distance may be less than 4 for some or all corresponding codes. The 16-bit coded blocks are appended to their associated 21-bit blocks of control information to yield codewords having a codespace shown in FIG. 2 where some or all of the corresponding codewords can have a coding distance (D) of less than 4. Generally D and $D_{MIN}$ are integers with values of 1 or greater.

To reduce the occurrences of corresponding codewords having coding distances of less than 4, the extended Hamming code is modified as follows. In step 106, the (16, 10, 4) extended Hamming coding scheme is actually a (16, 11, 4) coding scheme since Hamming coding does not have a (16, 10, 4) coding scheme. The (16, 11, 4) coding scheme is obtained by converting in some manner the 10 user ID bits to 11 user ID bits and inputting them into the (16, 11, 4) extending Hamming coding scheme. The coding scheme structure is shown in FIG. 3. Referring to FIG. 3, coder 300 is shown comprising three coding functions 302, 304 and 306. Function 302 pads a 10 bit user ID with an extra bit (1 or 0) in any position. The resulting 11-bit block is applied to a (16, 11, 4) extended Hamming coding function 304 which yields a 16-bit user ID block that is applied to code rotator 306. Code rotator 306 rotates the codespace of the resulting 16-bit user ID block to reduce the number of pairs of codewords (or corresponding codewords) in the overall code space of $2^{31}$ of FIG. 2 having a coding distance of less than 4. The rotation of the codespace is the translation of the entire codespace by a certain angle. The rotation of the code space and the padding of the input 10 bits with a 1 or 0 bit in any position are adjustments to be made in the (16, 10, 4) coding scheme to reduce the occurrence of pairs of corresponding codewords in the overall code space of $2^{31}$ of FIG. 2 having coding distances of less than 4. A trial and error or more sophisticated search methods can be applied to determine which bit value to pad at which position and which rotation to perform that will tend to lead to a reduction in the occurrences of coding distances of less than 4. Thus, there are three degrees of freedom (value of pad bit, location of pad bit, amount of rotation performed on code space) that can be adjusted and by trial and error or more sophisticated search to create an overall codespace with a relatively small number of pairwise (corresponding codewords) coding distances of less than 4. The output of coder 300 is modulo 2 added (with adder 308; exclusive-OR operation) to a 16-bit CRC generated from an associated 21-bit control information block resulting in a 16-bit user specific coded block which is appended to its associated 21-bit control information block and transmitted over the HS-SCCH to be decoded by its intended user.

The decoding of the codeword is shown in FIG. 4. The decoding structure is essentially the same as the coding structure shown in FIG. 3. Referring to FIG. 4, decoder 400 has coding functions 402, 404 and 406. Upon reception of control information over the HS-SCCH a user generates a 16-bit user specific coded block using padding function 402. The resulting 11-bit user ID is applied to extended Hamming coder 404 which generates a 16-bit vector. The 16-bit vector is applied to code rotator 406 which rotates the codespace and yields a 16 bit coded user ID codeword. The output of decoder 400 is applied to modulo 2 adder 408 along with the 16-bit received codeword. If the User IDs match, their sum that is the part of the modulo 2 addition that yields zero (cancels out) and the result of the modulo 2 addition is the received version of the standard 16 bit CRC corresponding to the transmitted information block. When the received information block's CRC is computed and checked against the received version of the CRC, they should match (i.e. add to zero) if the codeword received is intended for this user and there are no undetected errors due to channel degradation in the information or CRC part. If there is no match the received codeword is discarded and no decoding of the accompanying data traffic channel is done. By applying the (N, K, $D_{MIN}$) coding scheme to the K-bit user ID blocks, the resulting overall code space of $2^{31}$ codewords that are transmitted is such that there is a smaller likelihood that an unintended user would attempt to decode a received codeword. Therefore, the probability of false alarms is significantly reduced.

I claim:

1. A method for generating coded user ID information to be transmitted with signaling information to users of a communication system over shared signaling channels, the method comprising the steps of:

applying an (N, K, $D_{MIN}$) coding scheme to user ID information having K bits so that a resulting coded user ID block of information has N bits and has a codespace that has a minimum coding distance of $D_{MIN}$ where $D_{MIN}$ is as large as possible for particular values of K and N and where K and N are integers equal to 1 or greater, and K<N;

combining the coded user ID block of information with error detection code information, generated from the signaling information having I bits, to generate coded blocks of information having a pairwise coding distance $D_{xy}$ between arbitrary code blocks x and y, where $D_{xy}$, $D_{MIN}$ and I are integers equal to 1 or greater and x, y represent arbitrary codewords;

modifying the (N, K, $D_{MIN}$) coding scheme to reduce occurrences of $D_{xy} < D_{MIN}$ for the coded blocks; and transmitting over the shared signaling channels codewords comprising signaling information appended to coded blocks, to users of the communication system thus reducing occurrences of false alarms by users receiving the codewords.

2. The method of claim 1 where the step of combining the coded user ID information with error detection code information comprises modulo 2 adding the coded user information to the error detection code.

3. The method of claim 1 where the step of modifying the (N, K, $D_{MIN}$) coding scheme comprises the step of padding the K-bit user ID information with at least one bit and/or rotating the N-bit coded user ID information before it is combined with the error detection code.

4. The method of claim 1 where the communication system complies with the UMTS HSDPA standard and K=1, N=16, I=21 and $D_{MIN}$=4 and where the user ID coding scheme is a (16, 11, 4) code obtained by bit padding followed by extended Hamming (15, 11, 4) followed by rotation and the error detection code is a CRC code.

5. The method of claim 1 where the communication system complies with the UMTS HSDPA standard (work in progress) and K=1, N=16, I=21 and $D_{MIN}$=4 and where the user ID coding scheme is a (16, 11, 4) code obtained by a shortened Hamming (15, 10, 4) code followed by a bit padding which is followed by rotation and the error detection code is a CRC code.

6. The method of claim 4 where the 10-bit user ID information is padded with a 1 or 0 bit at a location within the 10-bit block tending to reduce occurrences of overall user specific corresponding coded blocks having coding distance of less than 4.

7. The method of claim 6 where the 15-bit partially coded user ID information is padded with a 1 or 0 bit at a location within the 15-bit block that to reduce occurrences of overall user specific corresponding coded blocks having a coding distance of less than 4.

8. The method of claims 4–7 where the resulting 16-bit coded user ID information is rotated by a certain angle before it is combined with the CRC code to reduce occurrences of overall user specific corresponding coded blocks having a coding distance of less than 4.

* * * * *